Patented Apr. 30, 1946

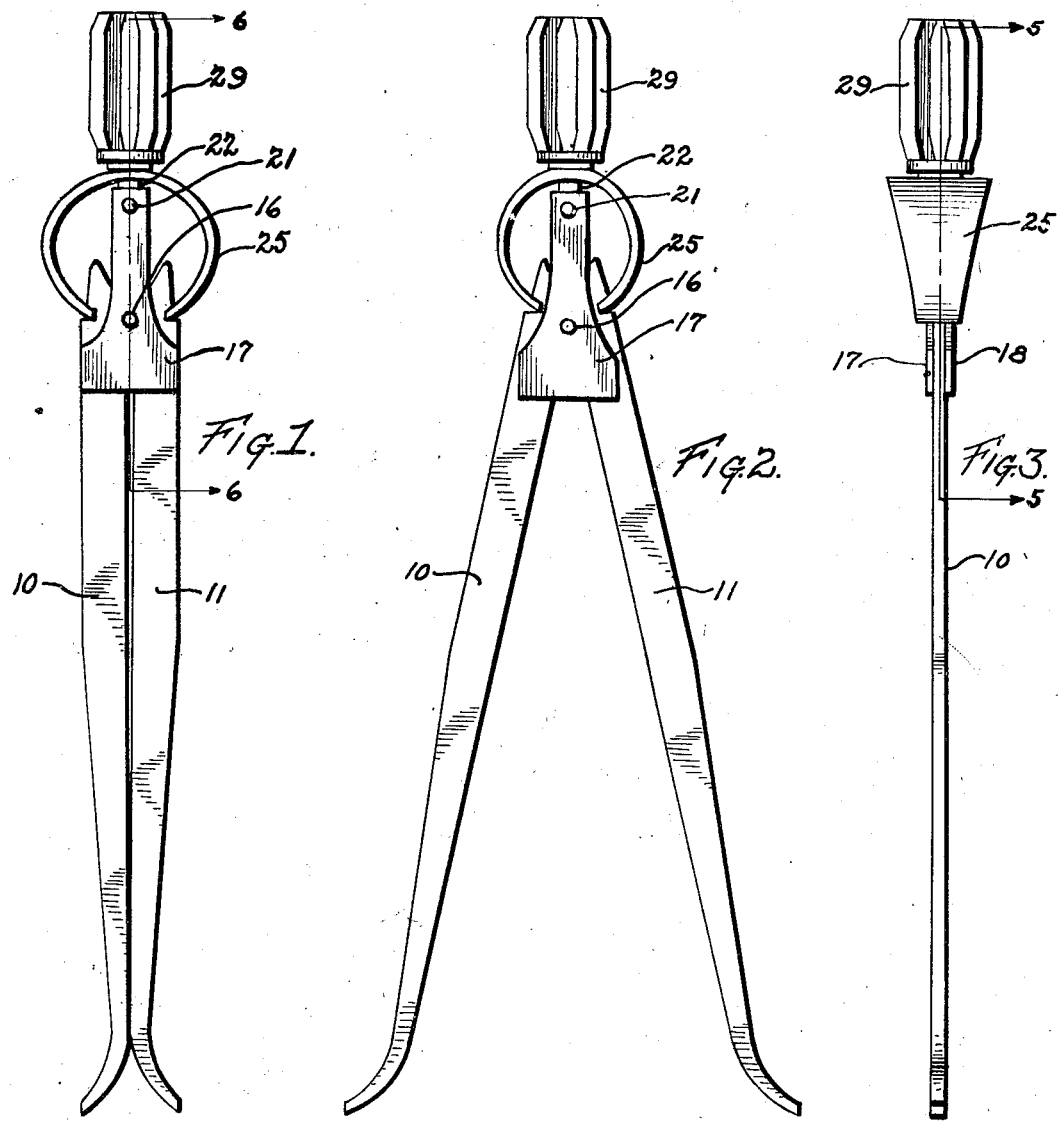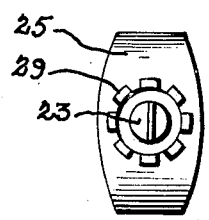

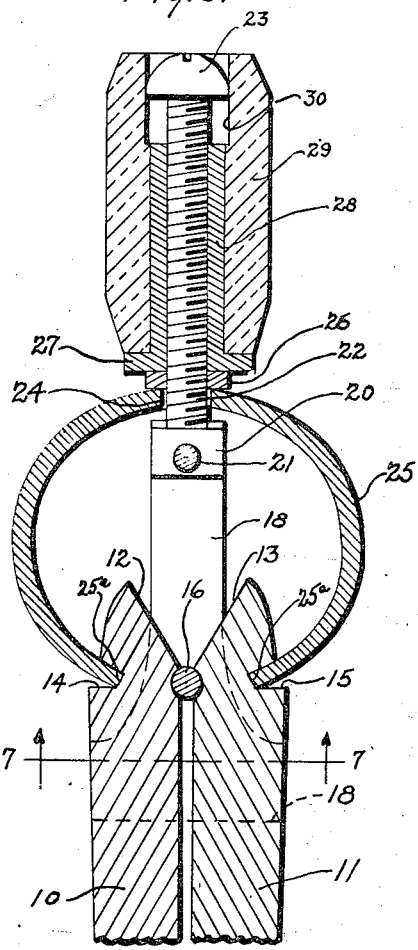
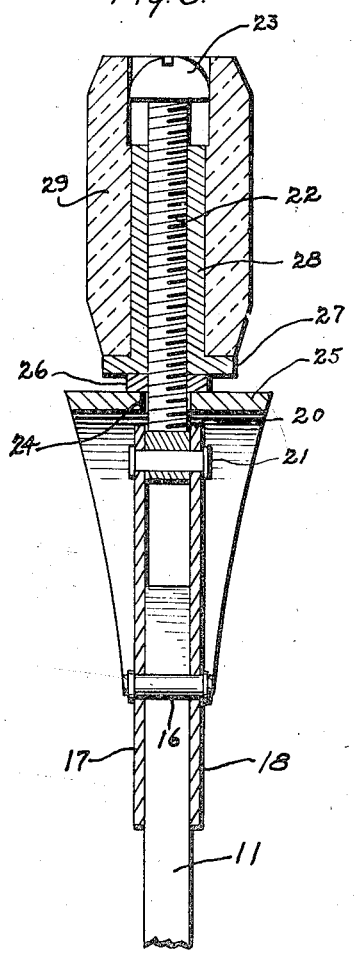
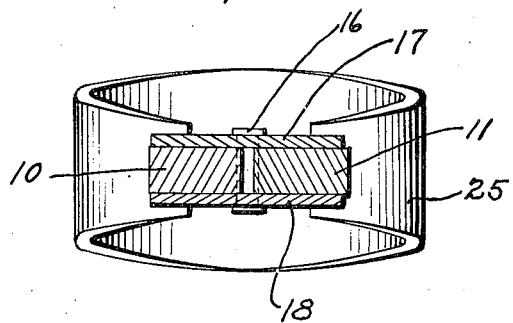

2,399,288

UNITED STATES PATENT OFFICE 2,399,288

MEASURING INSTRUMENT

Patrick J. Nealon, Lakewood, Ohio

Application October 17, 1944, Serial No. 559,016

2 Claims. (Cl. 33—156)

This invention relates to measuring instruments and more particularly to such an instrument as calipers, dividers, or the like.

A primary object of this invention is the provision of an improved measuring instrument such as a pair of calipers, characterized by the absence of the conventional horizontally extending adjusting screw, whereby the instrument may be utilized in spaces and apertures of relatively small dimensions.

An additional object of this invention is the provision of such an instrument which may be readily adjusted, the adjusting screw being carried in vertical position with respect thereto, whereby in certain instances, as in the case of the use of internal calipers in tubing, piping or the like, the instrument may be inserted to the full depth of the caliper without interference by any horizontally protruding adjusting mechanism.

A still further object of this invention is the provision of such an instrument which may be carried or contained in a relatively small space in a tool box or in the pocket, or the like, and which may be utilized with safety in restricted areas, without the possibility of a horizontally extending adjusting screw becoming entangled in adjacent mechanism.

Still another object is the provision of such a device which will be sturdy and durable in construction, reliable and efficient in operation, and relatively simple and inexpensive to manufacture and assemble.

Other objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a side elevational view of an inside caliper embodying this inventive concept.

Figure 2 is a view similar to Figure 1 showing the parts in a different position of adjustment.

Figure 3 is an end elevational view of the device shown in Figures 1 and 2.

Figure 4 is a top plan view of the device seen in Figure 1.

Figure 5 is an enlarged sectional view taken substantially along the line 5—5 of Figure 3.

Figure 6 is an enlarged sectional view taken substantially along the line 6—6 of Figure 1, and Figure 7 is a sectional view taken substantially along the line 7—7 of Figure 5 as viewed in the direction of the arrows.

Like reference numerals refer to like parts throughout the several views of the drawings.

Having reference now to the drawings there are shown at 10 and 11 two oppositely disposed caliper blades, each provided with inclines at their upper extremities 12 and 13, respectively, and each having a notch 14 and 15, respectively, cut into their outer surfaces at a point adjacent but slightly above a pivot pin 16, adapted to seat between two opposed arcuate surfaces formed on the inner sides of the blades 10 and 11.

Pivot pin 16 has its extremities suitably secured in two side plates 17 and 18, of substantially T-shaped configuration, the heads of the T's being adapted to extend across the blades 10 and 11. As best shown in Figures 5 and 6 a block 20 is positioned between the extremities of the legs of the T's, and secured therebetween as by a pin 21. Suitably secured to the block 20 in any desired manner is a bolt 22 terminating in an enlarged head 23.

The shank of bolt 22 passes through an aperture 24 in a mid-point of an arcuate leaf spring 25, the ends 25a of which are adapted to seat in notches 14 and 15 of blades 10 and 11, respectively, the tendency of the spring being to rotate the blades about the pivot 16 in such manner as to force inclines 12 and 13 into abutting relationship and separate the extremities of the blades 10 and 11.

A collet or washer 26 surrounds bolt 22 above spring 25, and normally abuts a flange 27 comprising the lower extremity of a threaded sleeve 28, surrounding which is a knurled knob 29 of plastic or other suitable composition, the lower extremity of which is seated on the flange 27. The upper extremity of the knob 29 extends a substantial distance above the upper extremity of the sleeve 28 to provide a recess 30 of a diameter sufficiently large to accommodate the head 23 of bolt 22.

Now from the foregoing the operation of the device should be readily understandable.

As the knob 29 is rotated downwardly on the bolt 22, the sleeve 28 threadedly engaging therewith, the spring 25 is flattened in such manner that its extremities 26 tend to separate, serving to force the blades 10 and 11 together about the pivot 16.

As the knob 29 is rotated in a reverse direction the pressure tending to flatten the spring 25 is relieved, permitting the ends 26 to contract toward each other, whereupon the blades are forced outwardly away from each other. The blades may continue to separate until the surfaces 12 and 13 are in abutting relation, or correspondingly until the bolt head 23 strikes the upper extremity of the sleeve 28, either of which serves to limit the further outward motion of the blades 10 and 11.

While the instant inventive concept has been hereinbefore described and shown in connection with a pair of inside calipers, it is to be understood that it may be equally advantageously applied to such instruments as outside calipers, dividers, or the like.

Now from the foregoing it will be seen that there is herein provided a device accomplishing all the objects of this invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a measuring instrument including a pair of pivotally associated blades having recesses therein and an arcuate spring having its extremities seated in said recesses and biasing the blades outwardly, a pair of opposed side plates, a pivot extending therebetween on which said blades pivot, a bolt secured between the upper extremities of said side plates and extending above said spring, and a nut on said bolt above said spring adapted when rotated to compress said spring to force said blades together.

2. In a measuring instrument including a pair of pivotally associated blades having recesses therein and an arcuate spring having its extremities seated in said recesses and biasing the blades outwardly, a pair of opposed side plates, a pivot extending therebetween on which said blades pivot, a bolt secured between the upper extremities of said side plates, means forming an aperture in a mid-point of said spring, said bolt extending above and through said aperture, and a nut on said bolt adapted when rotated to compress said spring to force said blades together.

PATRICK J. NEALON.